(12) United States Patent
Brown et al.

(10) Patent No.: US 7,387,437 B2
(45) Date of Patent: Jun. 17, 2008

(54) METHOD OF DETERMINING AMBIENT AIR TEMPERATURE

(75) Inventors: Kenneth Brown, Shelby Township, MI (US); Esteban Hernandez, White Lake, MI (US); Christos Kyrtsos, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 10/907,012

(22) Filed: Mar. 16, 2005

(65) Prior Publication Data

US 2006/0209921 A1 Sep. 21, 2006

(51) Int. Cl.
  *G01K 13/00* (2006.01)
  *G01K 7/00* (2006.01)
(52) U.S. Cl. .................. 374/141; 374/110; 702/130
(58) Field of Classification Search ............... 374/134, 374/161, 141, 144; 702/130
See application file for complete search history.

(56) References Cited

U.S. PATENT DOCUMENTS

| | | | |
|---|---|---|---|
| 4,770,543 A | 9/1988 | Burghoff et al. | |
| 4,970,496 A * | 11/1990 | Kirkpatrick | 340/585 |
| 5,001,656 A * | 3/1991 | Zimmerman et al. | 700/299 |
| 5,137,213 A * | 8/1992 | Yamamoto et al. | 237/2 A |
| 5,416,728 A | 5/1995 | Rudzewicz et al. | |
| 5,737,243 A | 4/1998 | Wallrafen | |
| 5,803,608 A * | 9/1998 | Randoll et al. | 374/144 |
| 5,813,765 A * | 9/1998 | Peel et al. | 374/141 |
| 5,895,117 A | 4/1999 | Wuertenberger | |
| 5,941,927 A * | 8/1999 | Pfitz | 701/102 |
| 5,944,256 A * | 8/1999 | Arai et al. | 236/49.3 |
| 6,088,661 A * | 7/2000 | Poublon | 702/130 |
| 6,168,515 B1 * | 1/2001 | Daimon et al. | 454/75 |
| 6,650,237 B2 | 11/2003 | Yamada et al. | |
| 6,665,629 B2 | 12/2003 | Manakkal et al. | |
| 6,725,710 B2 * | 4/2004 | Oka et al. | 73/118.1 |
| 6,974,251 B2 * | 12/2005 | DeRonne et al. | 374/144 |
| 2002/0007669 A1 * | 1/2002 | Ito | 73/116 |
| 2002/0111734 A1 * | 8/2002 | Wakahara et al. | 701/114 |
| 2004/0173195 A1 * | 9/2004 | Ament | 123/686 |
| 2004/0184509 A1 * | 9/2004 | DeRonne et al. | 374/141 |
| 2005/0071074 A1 * | 3/2005 | Super et al. | 701/102 |
| 2007/0036197 A1 * | 2/2007 | Huttenlocher et al. | 374/1 |

* cited by examiner

*Primary Examiner*—Gail Verbitsky
*Assistant Examiner*—Mirellys Jagan
(74) *Attorney, Agent, or Firm*—Raymond Coppiellie; Brooks Kushman P.C.

(57) ABSTRACT

A method of predicting ambient air temperature outside a passenger compartment of a vehicle. The method measures air temperature with a temperature sensor, applies a correction strategy, and determines a predicted temperature value.

20 Claims, 2 Drawing Sheets

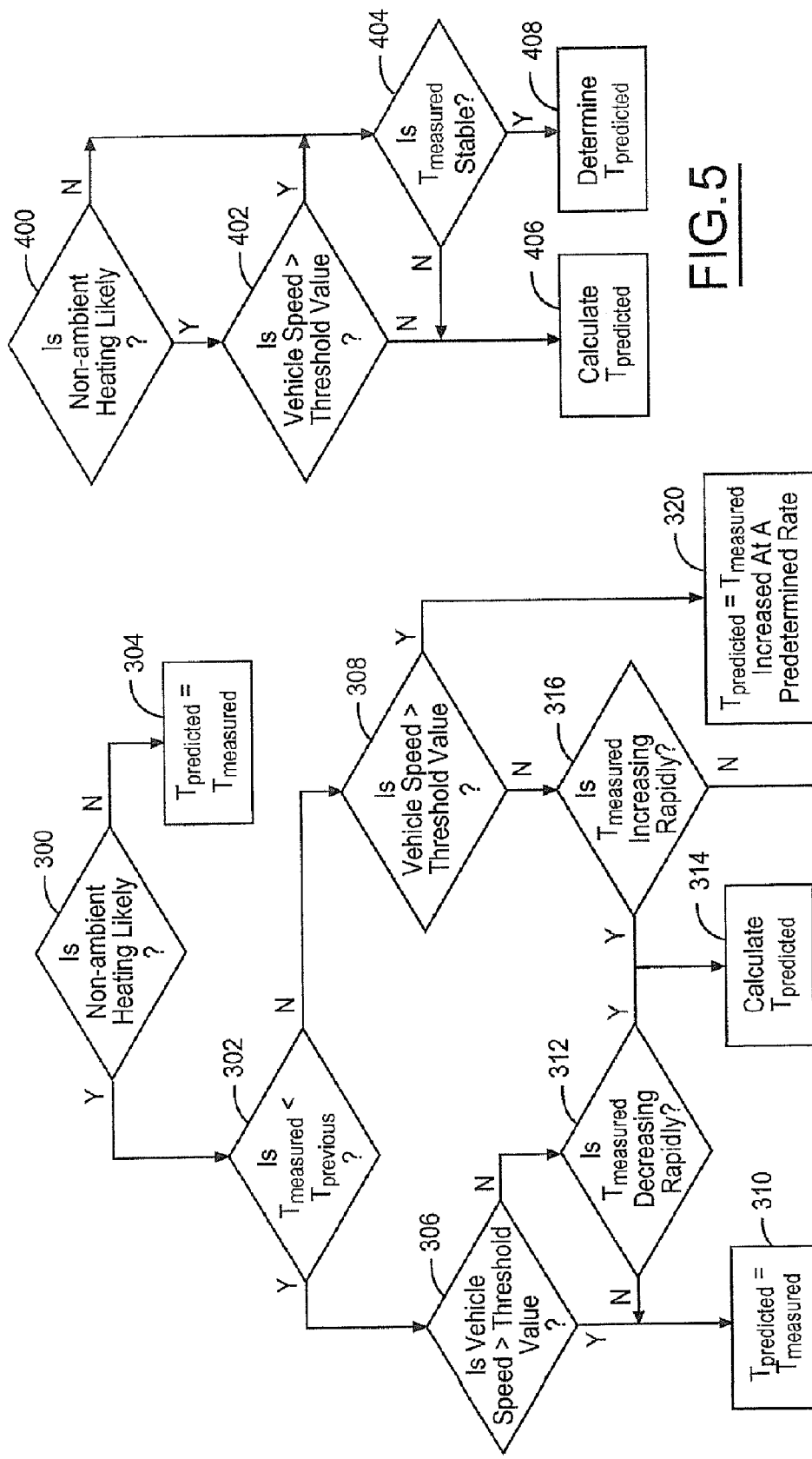

METHOD OF DETERMINING AMBIENT AIR TEMPERATURE

BACKGROUND OF THE INVENTION

1. Field of the Invention

The present invention relates to a method of determining ambient air temperature, and more specifically to a method of determining ambient air temperature outside a motor vehicle.

2. Background Art

Temperature sensors are used to measure the temperature of ambient air surrounding a motor vehicle. Such temperature sensors are often located where they may pick up heat from non-ambient heat sources, such as vehicle components like an engine or radiator. Heat from these non-ambient heat sources, as well as self-heating effects of the temperature sensor, may result in inaccurate ambient air temperature readings.

Previous strategies for determining ambient air temperature, such as that described in U.S. Pat. No. 4,770,543, simply ignored air temperature sensor readings at low vehicle speeds. Consequently, accurate temperature readings were not available when a vehicle was stationary or moving slowly. Moreover, such strategies yielded erroneous temperature readings during rapid temperature changes, such as when a vehicle was moved from a warm interior location to a cold exterior environment.

Before applicant's invention, there was a need for a method of more accurately determining ambient air temperature. In addition, there was a need for a method that accounts for the heating effects of non-ambient heat sources. Additionally, there was a need for a method that provides improved responsiveness to rapid temperature changes. In addition, there was a need for a method that could reduce the number of air temperature sensors used on a motor vehicle. Problems addressed by the prior art as noted above and other problems are addressed by applicant's invention as summarized below.

SUMMARY OF THE INVENTION

According to one aspect of the present invention, a method of determining air temperature outside a passenger compartment of a vehicle is provided. The vehicle includes first and second temperature sensors disposed outside the passenger compartment.

The method includes the steps of measuring air temperature with first and second temperature sensors to produce first and second measured temperature values, applying a correction strategy to the first and second measured temperature values to determine first and second predicted temperature values, and calculating a predicted air temperature value based on the first and second predicted temperature values. The method accounts for heat from non-ambient heat sources to more accurate determine ambient air temperature.

The predicted air temperature value may be based on an average or weighted average of the first and second predicted temperature values.

The first and/or second predicted temperature values may be set equal to a measured temperature value, may be set equal to a measured temperature value and increased at a predetermined rate, may be set equal to a moving average of sequential measured temperature values, or may be calculated with an exponential correction formula.

According to another aspect of the present invention, a method of predicting ambient air temperature outside a passenger compartment of a vehicle having an air temperature sensor is provided. The method includes the steps of predicting whether heat from a non-ambient heat source is increasing air temperature proximate the temperature sensor and calculating a predicted temperature value with an exponential correction formula. The exponential correction formula is employed when non-ambient heating is likely and a speed of the vehicle is not greater than a threshold value, or when non-ambient heating is not likely and the measured temperature value is stable. This method permits a single temperature sensor to be used and provides accurate ambient air temperature assessments.

According to another aspect of the present invention, a method of determining ambient air temperature outside a vehicle is provided. The vehicle includes a temperature sensor adapted to detect air temperature and provide a measured temperature value.

The method sets a predicted air temperature value equal to the measured temperature value when non-ambient heating is not likely, or when non-ambient heating is likely and either the measured temperature value is less than a previous measured temperature value and a speed of the vehicle is greater than a threshold speed value, or the measured temperature value is not less than a previous measured temperature value, the speed of the vehicle is not greater than the threshold speed value, and the measured temperature value is not increasing rapidly. The method sets the predicted air temperature value equal to the measured temperature value increased at a predetermined rate when non-ambient heat source is likely, the measured temperature value is not less than the previous measured temperature value, and the vehicle speed exceeds the threshold speed value. The method calculates the predicted air temperature value using a correction expression when non-ambient heating is likely and either the measured temperature value is less than a previous measured temperature value, the speed of the vehicle is not greater than the threshold speed value, and the measured temperature value is not decreasing rapidly, or the measured temperature value is not less than the previous measured temperature value, the speed of the vehicle is not greater than the threshold speed value, and the measured temperature value is increasing rapidly.

BRIEF DESCRIPTION OF THE DRAWINGS

FIG. 4 is a flowchart of one embodiment of a temperature correction strategy.

FIG. 5 is a flowchart of another embodiment of a temperature correction strategy.

DETAILED DESCRIPTION OF THE PREFERRED EMBODIMENT(S)

Figure 1:
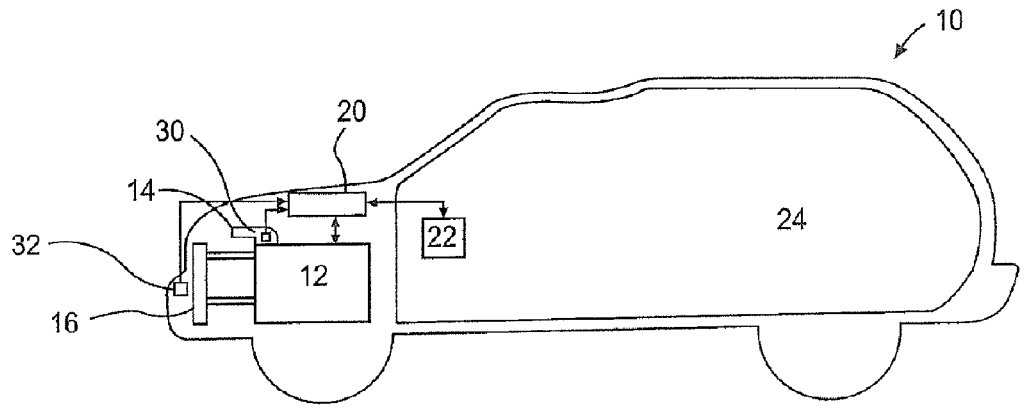
FIG. 1 is a schematic representation of a motor vehicle.

Referring to FIG. 1, a schematic representation of a vehicle 10 is shown. The vehicle 10 may be of any suitable type, such as a car or truck.

The vehicle 10 includes an engine 12 that is adapted to drive one or more vehicle traction wheels and provide power to vehicle components. The engine 12 includes an air intake manifold 14 adapted to provide air to facilitate combustion.

A radiator 16 is connected to the engine 12. The radiator 16 transfers heat from a coolant fluid that circulates through the engine 12 to the surrounding environment.

One or more control modules, such as a powertrain control module 20 and a climate control module 22, may be provided to monitor and/or control the operation of various vehicle components and subsystems. The powertrain control module 20 may be adapted to monitor and control the engine 12 and other powertrain components. The climate control module 22 may control heating and cooling of a vehicle passenger compartment 24. The climate control module 22 may include an interface for receiving operator commands and/or displaying operating parameters, such as the current ambient air temperature.

The control module 20 and climate control module 22 may receive signals from one or more sensors, such as an air intake temperature sensor 30 and/or an ambient air temperature sensor 32. The temperature sensors 30,32 may be of any suitable type, such as a thermocouple or thermistor. The air intake temperature sensor 30 may be disposed proximate the air intake manifold 14 and provide a signal indicative of the temperature of air passing through the air intake manifold 14. The ambient air temperature sensor 32 may be disposed in any suitable location, such as near a wheel well or grill. In the embodiment shown, the ambient air temperature sensor 32 is disposed between the front of the vehicle 10 and the radiator 16.

The temperature sensors 30,32 produce a signal indicative of the air temperature near the sensor. Air may be heated by one or more non-ambient heat sources, such as the engine 12, radiator 16, or by self-heating effects that are a byproduct of sensor operation. Heat from a non-ambient heat source causes a localized increase in air temperature that may be detected by a temperature sensor 30,32. In particular, heated air is more likely to be detected by a temperature sensor 30,32 when air circulation is inhibited, such as when the vehicle 10 is in an enclosure, positioned near a wall or other obstruction, or at low vehicle speeds. Under such conditions, a sensor 30,32 may produce temperature readings that do not accurately reflect the actual ambient air temperature in the environment surrounding the vehicle 10.

Inaccurate temperature signals may effect the operation of one or more vehicle components or subsystems. For example, an inaccurate ambient air temperature reading may result in excessive heating or cooling of the passenger compartment 24 by the climate control system, thereby degrading occupant comfort. In addition, incorrect temperature data may be displayed on the interface 26.

Referring to FIGS. 2-5, flowcharts are shown that are associated with methods of determining ambient air temperature. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing may be employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

Figure 2:
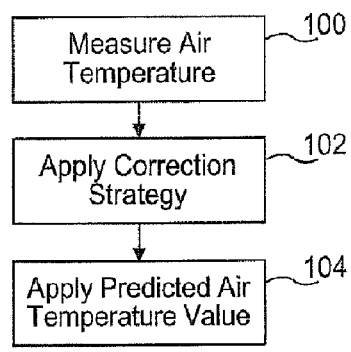
FIG. 2 is a flowchart of one embodiment of a method of determining ambient air temperature.

Referring to FIG. 2, one embodiment of a method of more accurately determining ambient air temperature is shown. This embodiment may be implemented using a single temperature sensor, such as the air intake temperature sensor 30. This method enables a reduction in the number of temperature sensors used on a vehicle. For example, the air intake temperature sensor 30 may be used to provide temperature data to the climate control module, thereby eliminating the cost associated with having a dedicated air temperature sensor for the climate control system.

At 100, the method begins by measuring the air temperature with a temperature sensor as previously described. The temperature data may be filtered in any suitable manner, such as by using a Kalman filter, to provide more refined temperature values.

At 102, a correction strategy is applied to generate a predicted ambient air temperature value. Correction strategies are shown in FIGS. 4 and 5 and will be described below in greater detail.

At 104, the ambient air temperature value generated by the correction strategy is used by one or more vehicle components or subsystems. For example, the predicted ambient air temperature value may be an input for a passenger compartment temperature control strategy, a heated windshield control strategy, and/or a fuel injection control strategy. In addition, the predicted ambient air temperature value may be displayed to a vehicle occupant.

Figure 3:
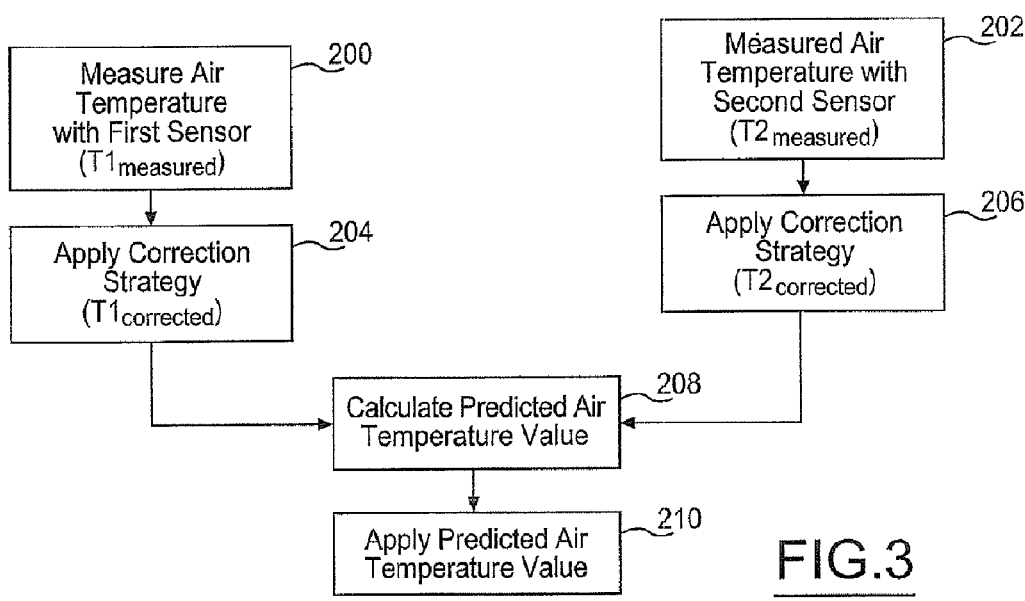
FIG. 3 is a flowchart of another embodiment of a method of determining ambient air temperature.

Referring to FIG. 3, an embodiment of a method of determining ambient air temperature with a plurality of temperature sensors is shown. This method may be modified or scaled to accommodate any suitable number of sensors or temperature signals. For illustrative purposes, FIG. 3 is depicts a method that utilizes signals from two temperature sensors, such as sensors 30 and 32.

At blocks 200 and 202, the method begins by measuring the air temperature with the first and second sensors, respectively. The temperature signal provided by the first sensor is designated $T1_{measured}$. Similarly, the temperature signal provided by the second sensor is designated $T2_{measured}$. The temperature data may be filtered in any suitable manner, such as by using a Kalman filter, to provide more refined temperature values.

At blocks 204 and 206, the correction strategy is applied to $T1_{measured}$ and $T2_{measured}$ to generate first and second predicted air temperature values. More specifically, block 204 yields a first predicted temperature value, designated $T1_{predicted}$. Similarly, block 206 yields a second predicted temperature value, designated $T2_{predicted}$.

At 208, a predicted air temperature value, designated $T_{Predicted}$, is calculated using the first and second predicted temperature values. In one embodiment, the predicted air temperature value is determined as a function of the expression:

$$T_{Predicted} = (T1_{Predicted} + T2_{Predicted})/2$$

where:

$T_{Predicted}$ is the predicted air temperature value,
$T1_{Predicted}$ is the first predicted temperature value, and
$T2_{Predicted}$ is the second predicted temperature value.

Alternatively, the predicted air temperature value may be based on a weighted average. More specifically, the predicted air temperature value may be determined as a function of the expression:

$$T_{Predicted} = C1 * T1_{Predicted} + C2 * T2_{Predicted}$$

where:

C1 and C2 are values between 0 and 1, selected to satisfy the equation C1+C2=1, $T_{Predicted}$ is the predicted air temperature value, $T1_{Predicted}$ is the first predicted temperature value, and $T2_{Predicted}$ is the second predicted temperature value.

At 210, the predicted air temperature value, $T_{Predicted}$, is provided to and/or used by one or more vehicle components or subsystems as previously described.

Referring to FIG. 4, one embodiment of a correction strategy is shown in more detail. For clarity, the correction strategy will be described in the context of an embodiment that employs a single temperature sensor.

At 300, the method begins by determining whether temperature measurements are likely to be affected by heat energy from a non-ambient heat source. The likelihood of non-ambient heating may be assessed in many ways. For example, non-ambient heating may be likely when the engine or other vehicle components have achieved an elevated temperature and have not had sufficient time to cool. In one embodiment, a timer may be used to measure an amount of time elapsed since the engine was turned off. If the elapsed time is less than a threshold time value, it is likely that heat from the engine and/or other vehicle components will affect air temperature measurements. Alternatively, the method may compare the engine coolant temperature to a threshold coolant temperature value. If the engine coolant temperature exceeds the threshold coolant temperature value, non-ambient heating is likely.

Threshold time and temperature values may be established by experimentation or development testing. For instance, the threshold time value may be satisfied when the engine has been running for less than ten minutes or has been off for more than four hours. The threshold temperature value may be at least 20° C. greater than the ambient temperature. If non-ambient heating is likely, the method continues at block 302. If non-ambient heating is not likely, the method continues at block 304 where the predicted air temperature value, $T_{predicted}$, is set equal to the measured air temperature, $T_{measured}$.

At 302, the method determines whether the air temperature currently measured by the temperature sensor, ($T_{measured}$) is less than a previous temperature value ($T_{previous}$). The previous temperature value may be a measured air temperature value stored in memory at an earlier time. For example, the previous temperature value may initially be recorded at approximately the same time as the engine was turned off. Alternatively, the previous temperature value may be stored during a previous iteration of the method. If $T_{measured}$ is less than $T_{previous}$, then the method continues at block 306. If $T_{measured}$ is not less than $T_{previous}$, then the method continues at 308.

At 306, the method compares the vehicle speed to a threshold speed value. Increased vehicle speed generally increases airflow around the sensor and is likely to reduce the non-ambient heating effects. If the vehicle speed is greater than the threshold speed value, then the method continues at block 310. If the vehicle speed does not exceed the threshold speed value, then the method continues at block 312.

At 310, the method sets the predicted air temperature value, $T_{predicted}$, equal to the measured air temperature, $T_{measured}$.

At 312, the method determines whether the measured air temperature ($T_{measured}$) is decreasing rapidly. More specifically, $T_{measured}$ is compared to one or more previous measured air temperature values to determine its rate of change. The rate of change of $T_{measured}$ is compared to a predetermined rate of change value. If the rate of change of $T_{measured}$ is less than the predetermined value, then the temperature is changing at a slow rate and the method continues at block 310. If the rate of change of $T_{measured}$ is greater than the predetermined value, then the temperature is changing at a fast rate and the method continues at block 314.

At 314, the method calculates the predicted air temperature value, $T_{predicted}$. Various calculation methodologies may be employed. In one embodiment, $T_{predicted}$ is calculated by increasing the measured temperature value at a predetermined rate. More specifically, the method takes the measured temperature value provided by the sensor and increments the value at a predetermined rate. The predetermined rate may be extrapolated from prior data in any suitable manner, such as by using a Kalman filter or regression in a manner known by those skilled in the art. In addition, the predetermined rate may be any suitable amount, such as a rate of between 1 to 8° C. per minute.

$T_{predicted}$ may also be calculated using an exponential correction formula. The exponential correction formula is based on the principle that as a system to comes to thermal equilibrium with its surroundings, the temperature difference tends toward zero in an exponential manner. The exponential correction formula may be based on a non-linear regression analysis. More specifically, the exponential correction formula may be based on the expression:

$$T_{Predicted} = A * e^{(-B*t)} + C$$

where:

$T_{Predicted}$ is the predicted air temperature value at time t, and

A, B and C are values determined from a nonlinear regression analysis.

A nonlinear regression analysis may be conducted in any suitable manner as known by those skilled in the art. More specifically, a nonlinear regression analysis may be performed on a series of sequential data points provided by the temperature sensor. For each data point, the regression analysis produces three parameters, designated A, B and C, where B is the rate of decay. In the exponential correction expression presented above, the exponential portion tends toward zero as time tends toward infinity, resulting in the following formula:

$$T_{Predicted} = 0 + C$$

As a result, the predicted temperature may be set equal to C at sufficiently large time values. Moreover, as the value of C becomes sufficiently close to the actual ambient air temperature, the predicted air temperature value may be based on the expression:

$$T_{Predicted} = C_{Average} \text{ when } |C_i - C_{Average}| < C_{Threshold}$$

where:

$T_{Predicted}$ is the predicted ambient air temperature, $C_{Threshold}$ is a constant between 0 and 1, $C_i$ is the value of parameter C from a non-linear regression analysis at time i, and $C_{Average}$ is the average or moving average of n consecutive C values based on the expression:

$$\frac{\sum_{i=1}^{n} C_i}{n}$$

where:

n is an integer indexed for each data point.

In this expression, any suitable number of data points may be employed, such as five or more data points.

Returning to block 308, the method compares the vehicle speed to the threshold speed value as previously described in block 306. If the vehicle speed does not exceed the threshold speed value, then the method continues at block 316. If the vehicle speed is greater than the threshold speed value, then the method continues at block 320.

At 316, the method determines whether the measured air temperature is increasing rapidly. More specifically, $T_{measured}$ is compared to one or more previous measured air temperature values to determine its rate of change. The rate of change of $T_{measured}$ is compared to a predetermined rate of change value. If the rate of change of $T_{measured}$ is greater than the predetermined value, then the temperature is changing at a fast rate and the method continues at block 314. If the rate of change of $T_{measured}$ is less than the predetermined value, then the temperature is changing at a slow rate and the method continues at block 318.

At 318, the method sets the predicted air temperature value, $T_{predicted}$, equal to the measured air temperature, $T_{measured}$, similar to block 310.

At 320, the method determines a predicted air temperature value, $T_{predicted}$, by increasing the measured temperature value at a predetermined rate. More specifically, the method takes the measured temperature value provided by the sensor and increments the value at a predetermined rate as discussed above with reference to block 314.

Referring to FIG. 5, another embodiment of a correction strategy is shown in more detail. For clarity, the correction strategy will be described in the context of an embodiment that employs a single temperature sensor, such as an air intake temperature sensor.

At 400, the method begins by determining whether temperature measurements are likely to be affected by heat energy from a non-ambient heat source as described above with reference to block 300. If non-ambient heating is likely, the method continues at block 402. If non-ambient heating is not likely, the method continues at block 404.

At 402, the method compares the vehicle speed to a threshold speed value as described above with reference to block 300. Increased vehicle speed generally increases airflow through the air intake manifold and around the sensor, which may reduce the non-ambient heating effects. If the vehicle speed is greater than the threshold speed value, then the method continues at block 404. If the vehicle speed does not exceed the threshold speed value, then the method continues at block 406.

At 404, the method determines whether the measured temperature is generally stable. Stability may be assessed in any suitable manner, such as by assessing the trend or change in a predetermined number of $T_{measured}$ values. For example, a regression analysis may be performed using a series of consecutive $T_{measured}$ values. The slope of the regression line or its absolute value may be compared to a predetermined slope value indicative of the presence of a trend. Moreover, the measured temperature signal may be filtered to reduce noise and help provide better stability assessments. If the measured temperature is not considered to be stable, then the method continues at block 406. If the measured temperature is considered to be stable, then the method continues a block 408.

At 406, the method calculates a predicted temperature value as described above with reference to block 314.

At 408, the method determines the predicted temperature value ($T_{predicted}$). If non-ambient heating is not likely and $T_{measured}$ is stable, then $T_{predicted}$ may be set equal to the current measured temperature value. If non-ambient heating is likely and $T_{measured}$ is stable, then $T_{predicted}$ may be extrapolated from prior temperature data in any suitable manner, such as by using a Kalman filter.

The present invention provides improved predictions of ambient air temperature. In addition, the present invention permits a single temperature sensor, such as an air intake manifold temperature sensor, to provide data for use by a climate control system, thereby reducing the number of components and associated costs. In addition, the present invention provides a more refined prediction of temperature values under a variety of environmental and vehicle operating conditions.

While the best mode for carrying out the invention has been described in detail, those familiar with the art to which this invention relates will recognize various alternative designs and embodiments for practicing the invention as defined by the following claims.

What is claimed is:

1. A method of determining air temperature outside a passenger compartment of a vehicle, the vehicle including first and second temperature sensors disposed outside the passenger compartment, the method comprising:

measuring air temperature with the first temperature sensor to produce a first measured temperature value;

measuring air temperature with the second temperature sensor to produce a second measured temperature value;

applying a correction strategy to the first and second measured temperature values to determine first and second predicted temperature values, respectively; and calculating a predicted ambient air temperature value based on the first and second predicted temperature values;

wherein the second predicted temperature value is set equal to the second measured temperature value when heating from a non-ambient heat source is not predicted.

2. The method of claim 1 wherein the predicted ambient air temperature value is determined as a function of the expression $$T_{Predicted} = (T1_{Predicted} + T2_{Predicted})/2$$

where:

$T_{Predicted}$ is the predicted ambient air temperature value, $T1_{Predicted}$ is the first predicted temperature value, and $T2_{Predicted}$ is the second predicted temperature value.

3. The method of claim 1 wherein the predicted ambient air temperature value is determined as a function of the expression $$T_{Predicted} = C1 * T1_{Predicted} + C2 * T2_{Predicted}$$

where:

C1 and C2 are values between 0 and 1 selected such that C1+C2=1, $T_{Predicted}$ is the predicted ambient air temperature value, $T1_{Predicted}$ is the first predicted temperature value, and
$T2_{Predicted}$ is the second predicted temperature value.

4. The method of claim 1 wherein the step of applying the correction strategy further comprises setting the first predicted temperature value equal to the first measured temperature value when
   heating from a non-ambient heat source is predicted and either
      the first measured temperature value is less than a previous first measured temperature value and a speed of the vehicle is greater than a threshold speed value, or
      the first measured temperature value is not less than a previous first measured temperature value, the speed of the vehicle is not greater than the threshold speed value, and the first measured temperature value is not increasing rapidly; or
   heating from a non-ambient heat source is not predicted.

5. The method of claim 1 wherein the step of applying the correction strategy further comprises setting the second predicted temperature value equal to the second measured temperature value when
   heating from a non-ambient heat source is predicted and either
      the second measured temperature value is less than a previous second measured temperature value and a speed of the vehicle is greater than a threshold speed value, or
      the second measured temperature value is not less than a previous second measured temperature value, the speed of the vehicle is not greater than the threshold speed value, and the second measured temperature value is not increasing rapidly; or
   heating from a non-ambient heat source is not predicted.

6. The method of claim 1 wherein the step of applying the correction strategy further comprises setting the first predicted temperature value equal to the first measured temperature value and increasing the first predicted temperature value at a predetermined rate when
   heating from a non-ambient heat source is predicted, and
   the first measured temperature value is not less than a previous first measured temperature value, and
   a speed of the vehicle is greater than a threshold speed value.

7. The method of claim 1 wherein the step of applying the correction strategy further comprises setting the second predicted temperature value equal to the second measured temperature value and increasing the second predicted temperature value at a predetermined rate when
   heating from a non-ambient heat source is predicted, and
   the second measured temperature value not is less than a previous second measured temperature value, and
   a speed of the vehicle is greater than a threshold speed value.

8. The method of claim 1 wherein the step of applying the correction strategy further comprises calculating the first predicted temperature value based on a moving average of sequential first measured temperature values when heating from a non-ambient heat source is predicted and either
   the first measured temperature value is less than a previous first measured temperature value, a speed of the vehicle is not greater than a threshold speed value, and the first measured temperature value is not decreasing rapidly, or
   the first measured temperature value is not less than a previous first measured temperature value, the speed of the vehicle is not greater than the threshold speed value, and the first measured temperature value is increasing rapidly.

9. The method of claim 1 wherein the step of applying the correction strategy further comprises calculating the second predicted temperature value based on a moving average of sequential second measured temperature values when heating from a non-ambient heat source is predicted and either
   the second measured temperature value is less than a previous second measured temperature value, a speed of the vehicle is not greater than a threshold speed value, and the second measured temperature value is not decreasing rapidly, or
   the second measured temperature value is not less than a previous second measured temperature value, the speed of the vehicle is not greater than the threshold speed value, and the second measured temperature value is increasing rapidly.

10. The method of claim 1 wherein the step of applying the correction strategy further comprises calculating the first predicted temperature value with an exponential correction formula when heating from a non-ambient heat source is predicted and either
    the first measured temperature value is less than a previous first measured temperature value, a speed of the vehicle is not greater than a threshold speed value, and the first measured temperature value is not decreasing rapidly, or
    the first measured temperature value is not less than a previous first measured temperature value, the speed of the vehicle is not greater than the threshold speed value, and the first measured temperature value is increasing rapidly.

11. The method of claim 1 wherein the step of applying the correction strategy further comprises calculating the second predicted temperature value with an exponential correction formula when heating from a non-ambient heat source is predicted and either
    the second measured temperature value is less than a previous second measured temperature value, a speed of the vehicle is not greater than a threshold speed value, and the second measured temperature value is not decreasing rapidly, or
    the second measured temperature value is not less than a previous second measured temperature value, the speed of the vehicle is not greater than the threshold speed value, and the second measured temperature value is increasing rapidly.

12. The method of claim 1 wherein the step of applying a correction strategy to the first and second measured temperature values to determine first and second predicted temperature values is determined using an exponential correction formula that as a function of the expression $$T_{Predicted} = A * e^{(-B*t)} + C$$

where:
   $T_{Predicted}$ is the predicted air temperature value at time t, and
   A, B and C are values determined from a nonlinear regression analysis.

13. A method of predicting ambient air temperature outside a passenger compartment of a vehicle, the vehicle including a temperature sensor, the method comprising:
   predicting whether heat from a non-ambient heat source is increasing air temperature proximate the temperature sensor; and calculating a predicted temperature value with a correction expression when non-ambient heating is likely and a speed of the vehicle is not greater than a threshold value, and when non-ambient heating is not likely and a measured temperature value not is stable.

14. The method of claim 13 wherein the temperature sensor is disposed proximate an air intake manifold.

15. The method of claim 13 wherein the step of predicting whether heat from a non-ambient heat source is increasing air temperature proximate the temperature sensor includes determining whether an engine coolant temperature is greater than a threshold coolant temperature value.

16. The method of claim 13 wherein the step of predicting whether heat from a non-ambient heat source is increasing air temperature proximate the temperature sensor includes determining whether an amount of time since the engine was turned off is less than a predetermined time value.

17. The method of claim 13 wherein the predicted temperature value is set equal to a previous temperature value when non-ambient heating is not likely and the measured temperature value is not stable.

18. The method of claim 17 wherein the correction expression is an exponential correction formula is based on a non-linear regression analysis.

19. The method of claim 18 wherein the exponential correction formula is based on the expression:

$$T_{Predicted} = C_{Average} \text{ when } |C_i - C_{Average}| > C_{Threshold}$$

where:

$T_{Predicted}$ is the predicted ambient air temperature, $C_{Threshold}$ is a constant between 0 and 1, $C_i$ is the value of parameter C from a non-linear regression analysis at time i, and $C_{Average}$ is the average of n consecutive C values based on the expression:

$$\frac{\sum_{i=1}^{n} C_i}{n}$$

where:

n is an integer indexed for each data point.

20. A method of determining ambient air temperature outside a vehicle, the vehicle including a temperature sensor adapted to detect air temperature, the method comprising:

setting a predicted air temperature value equal to a measured temperature value provided by the temperature sensor when non-ambient heating is not likely, or when non-ambient heating is likely and either the measured temperature value is less than a previous measured temperature value and a speed of the vehicle is greater than a threshold speed value, or the measured temperature value is not less than a previous measured temperature value, the speed of the vehicle is not greater than the threshold speed value, and the measured temperature value is not increasing rapidly;

setting the predicted air temperature value equal to the measured temperature value increased at a predetermined rate when non-ambient heat source is likely, the measured temperature value is not less than the previous measured temperature value, and the vehicle speed exceeds the threshold speed value; and calculating the predicted air temperature value using a correction expression when non-ambient heating is likely and either the measured temperature value is less than a previous measured temperature value, the speed of the vehicle is not greater than the threshold speed value, and the measured temperature value is not decreasing rapidly, or the measured temperature value is not less than the previous measured temperature value, the speed of the vehicle is not greater than the threshold speed value, and the measured temperature value is increasing rapidly.

* * * * *